United States Patent
Ye et al.

(10) Patent No.: US 8,542,730 B2
(45) Date of Patent: Sep. 24, 2013

(54) FAST MACROBLOCK DELTA QP DECISION

(75) Inventors: Yan Ye, San Diego, CA (US); Marta Karczewicz, San Diego, CA (US); Peisong Chen, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 930 days.

(21) Appl. No.: 12/389,693

(22) Filed: Feb. 20, 2009

(65) Prior Publication Data

US 2009/0213930 A1 Aug. 27, 2009

Related U.S. Application Data

(60) Provisional application No. 61/030,857, filed on Feb. 22, 2008.

(51) Int. Cl.
| | |
|---|---|
| H04N 7/26 | (2006.01) |
| H04N 7/30 | (2006.01) |
| H04N 11/02 | (2006.01) |
| H04N 11/04 | (2006.01) |
| G06K 9/32 | (2006.01) |
| H04B 7/12 | (2006.01) |
| H04N 7/12 | (2006.01) |

(52) U.S. Cl.
USPC ............ 375/240.03; 375/240.12; 375/240.16; 382/232; 348/413

(58) Field of Classification Search
USPC .......... 375/240.03, 240.16, 240.12; 382/232; 348/413
See application file for complete search history.

(56) References Cited

U.S. PATENT DOCUMENTS

| | | | |
|---|---|---|---|
| 6,011,589 A | 1/2000 | Matsuura et al. | |
| 2003/0219073 A1 | 11/2003 | Lee et al. | |
| 2004/0037357 A1 | 2/2004 | Bagni et al. | |
| 2005/0069215 A1 | 3/2005 | Awano | |
| 2006/0018552 A1 * | 1/2006 | Malayath et al. | ............. 382/232 |
| 2006/0227870 A1 | 10/2006 | Tian et al. | |
| 2007/0009027 A1 | 1/2007 | Zhu et al. | |
| 2007/0140344 A1 * | 6/2007 | Shima | ....................... 375/240.16 |
| 2008/0304562 A1 * | 12/2008 | Chang et al. | ............. 375/240.03 |

FOREIGN PATENT DOCUMENTS

| | | |
|---|---|---|
| EP | 0663778 A2 | 7/1995 |
| EP | 1615444 A2 | 1/2006 |
| EP | 1727371 A1 | 11/2006 |
| EP | 2096874 A1 * | 9/2009 |
| JP | 10079948 A | 3/1998 |

(Continued)

OTHER PUBLICATIONS

Thomas Stockhammer, Günther Liebl, Michael Walter; "Optimized H.264/AVC-based bit stream switching for mobile video streaming"; Jan. 2006; EURASIP Journal on Applied Signal Processing, vol. 2006, pp. 1-19.*

(Continued)

*Primary Examiner* — Andrew L Nalven
*Assistant Examiner* — Courtney Fields
(74) *Attorney, Agent, or Firm* — Todd E. Marlette

(57) ABSTRACT

A system and method for encoding multimedia video is described. As video is encoded a quantization parameter is selected for each macroblock. As described herein, the quantization parameter for each macroblock may be selected by limiting the universe of all possible quantization parameters to a particular range of possible quantization parameter values. This increases the speed of video encoding by reducing the number of quantization parameters that are tested for each video macroblock.

47 Claims, 5 Drawing Sheets

(56) References Cited

FOREIGN PATENT DOCUMENTS

| | | | |
|---|---|---|---|
| JP | 10191343 | A | 7/1998 |
| JP | 2005515719 | A | 5/2005 |
| JP | 2006033426 | A | 2/2006 |
| JP | 2006121657 | | 5/2006 |
| KR | 2006122775 | A | 11/2006 |
| RU | 2127962 | C1 | 3/1999 |
| RU | 2154918 | C1 | 8/2000 |
| WO | WO03061265 | A2 | 7/2003 |
| WO | 2006095501 | A1 | 9/2006 |
| WO | 2006099086 | A1 | 9/2006 |
| WO | WO2006099229 | A1 | 9/2006 |
| WO | WO2007148619 | A1 | 12/2007 |
| WO | WO2008010979 | A2 | 1/2008 |

OTHER PUBLICATIONS

M. Karczewicz and Y. Ye, "Rate-distortion optimized quantization," document No. VCEG- AH21, Antalya, Turkey, Jan. 2008.

Do-Kyoung Kwon., et al.,"Rate Control for H.264 Video With Enhanced Rate and Distortion Models" IEEE Transactions on Circuits and Systems for Video Technology, vol. 16, No. 5, May 1, 2007, pp. 517-529, XP011179787 Piscataway, NJ, USA ISSN: 1051-8215 abstract; figure 2 p. 518, right-hand column, line 17—line 22 p. 524, algorithm steps 2 and 3.

International Preliminary Report on Patentability-PCT/US09/034800,—International Search Authority-European Patent Office, Apr. 6, 2010.

International Search Report and Written Opinion—PCT/US09/034800, International Search Authority—European Patent Office—Aug. 6, 2009.

Jianfeng Xu., et al., "A novel rate control for H.264" Proceedings of the 2004 International Symposium on Circuits and Systems, May 23, 2004, pp. III-809-III-812 , XP010719387 Piscataway, NJ, USA ISBN: 978-0-78038251-0 abstract; figure 5 sections 2.2, 2.3.

Lee, Liang-Wei, et al.; "On the Error Distribution and Scene Change for the Bit Rate Control of MPEG" IEEE 1993 International Conference on Consumer Electronics, Digest of Technical Papers., Jun. 8, 1993, pp. 286-287, XP010107287, Piscataway, NJ, USA, ISBA: 978-0/7803-0843-5 abstract; figure 1 equation 3.

Sullivan G. J., et al., "Rate-Distortion Optimization for Video Compression" IEEE Signal Processing Magazine, IEEE Service Center, Piscataway, NJ, US, vol. 15, No. 6, Nov. 1, 1998, pp. 74-90, XP011089821 ISSN: 1053-5888 the whole document.

Liang-Wei Lee et al., "On the Error Distribution and Scene Change for the Bit Rate Control of MPEG", IEEE Transactions on Consumer Electronics, vol. 39, Issue 3, pp. 545-554, Jun. 10, 1993.

Richardson I., "H.264 and MPEG-4 Video Compression: Video Coding for Next Generation Multimedia", Moscow, Technosphera, 2005, pp. 330-336.

Taiwan Search Report—TW098105686—TIPO—Apr. 11, 2012.

\* cited by examiner

FAST MACROBLOCK DELTA QP DECISION

RELATED APPLICATIONS

This application claims priority to U.S. Provisional Patent Application No. 61/030,857, filed Feb. 22, 2008, which is incorporated herein by reference in its entirety.

BACKGROUND

1. Field of the Invention

Present embodiments relate to multimedia image processing. More particularly, these embodiments relate to a system and method for adaptively controlling the digital bit rate and compression quality of digital video in a video encoder.

2. Description of the Related Art

Digital video capabilities can be incorporated into a wide range of devices, including digital televisions, digital direct broadcast systems, wireless communication devices, personal digital assistants (PDAs), laptop computers, desktop computers, digital cameras, digital recording devices, cellular or satellite radio telephones, and the like. These and other digital video devices can provide significant improvements over conventional analog video systems in creating, modifying, transmitting, storing, recording and playing full motion video sequences.

A number of different video encoding standards have been established for communicating digital video sequences. The Moving Picture Experts Group (MPEG), for example, has developed a number of standards including MPEG-1, MPEG-2 and MPEG-4. Other encoding standards include H.261/H.263, MPEG1/2/4 and the latest H.264/AVC.

Video encoding standards achieve increased transmission rates by encoding data in a compressed fashion. Compression can reduce the overall amount of data that needs to be transmitted for effective transmission of image frames. The H.264 standards, for example, utilize graphics and video compression techniques designed to facilitate video and image transmission over a narrower bandwidth than could be achieved without the compression. In particular, the H.264 standards incorporate video encoding techniques that utilize similarities between successive image frames, referred to as temporal or interframe correlation, to provide interframe compression. The interframe compression techniques exploit data redundancy across frames by converting pixel-based representations of image frames to motion representations. In addition, the video encoding techniques may utilize similarities within image frames, referred to as spatial or intraframe correlation, in order to achieve intra-frame compression in which the spatial correlation within an image frame can be further compressed. The intraframe compression is typically based upon conventional processes for compressing still images, such as spatial prediction and discrete cosine transform (DCT) encoding.

To support the compression techniques, many digital video devices include an encoder for compressing digital video sequences, and a decoder for decompressing the digital video sequences. In many cases, the encoder and decoder comprise an integrated encoder/decoder (CODEC) that operates on blocks of pixels within frames that define the sequence of video images. In the H.264 standard, for example, the encoder of a sending device typically divides a video image frame to be transmitted into macroblocks comprising smaller image blocks. For each macroblock in the image frame, the encoder searches macroblocks of the neighboring video frames to identify the most similar macroblock, and encodes the difference between the macroblocks for transmission, along with a motion vector that indicates which macroblock from the reference frame was used for encoding. The decoder of a receiving device receives the motion vector and encoded differences, and performs motion compensation to generate video sequences.

The difference between the macroblocks is transformed and then quantized. A quantization parameter (QP) is used to perform the quantization and will thus determine the control bit rate and recovered frame quality. Quantization using a higher QP corresponds to lower bit rate and lower quality. Quantization using a lower QP corresponds to higher bit rate and higher quality. By adjusting the QP, different bit rates and degrees of quality can be realized.

SUMMARY OF THE INVENTION

In some embodiments, a system for encoding video is provided, the system comprising a storage, the storage comprising a video frame in turn comprising a macroblock. The system also includes a quantization module configured to select a range of quantization parameters for quantizing the macroblock, wherein the range is a subset of possible quantization parameters; a processor configured to determine a quantization parameter in the range which results in the optimal quantization of the macroblock; and an encoder configured to encode the macroblock using the determined quantization parameter.

In some embodiments, a system for encoding video is provided, comprising means for receiving a video frame comprising a macroblock for quantization; means for selecting a range of quantization parameters for quantizing the macroblock, wherein the range is a subset of possible quantization parameters; means for determining the quantization parameter in the range which results in the optimal quantization value for the macroblock; and means for encoding the macroblock using the determined quantization parameter.

In some embodiments, a method for encoding video is provided, comprising: receiving a video frame comprising a macroblock for quantization; selecting a range of quantization parameters for quantizing the macroblock, wherein the range is a subset of possible quantization parameters; determining the quantization parameter in the range which results in the lowest distortion value for the macroblock; and encoding the macroblock using the determined quantization parameter.

In some embodiments, a computer readable medium is provided, comprising a computer readable program code adapted to be executed to perform a method comprising: receiving a video frame comprising a macroblock for quantization; selecting a range of quantization parameters for quantizing the macroblock, wherein the range is a subset of possible quantization parameters; determining the quantization parameter in the range which results in the lowest distortion value for the macroblock; and encoding the macroblock using the determined quantization parameter.

BRIEF DESCRIPTION OF THE DRAWINGS

The features, objects, and advantages of the disclosed embodiments will become more apparent from the detailed description set forth below when taken in conjunction with the drawings in which like reference characters identify correspondingly throughout and wherein.

DETAILED DESCRIPTION

Figure 1:
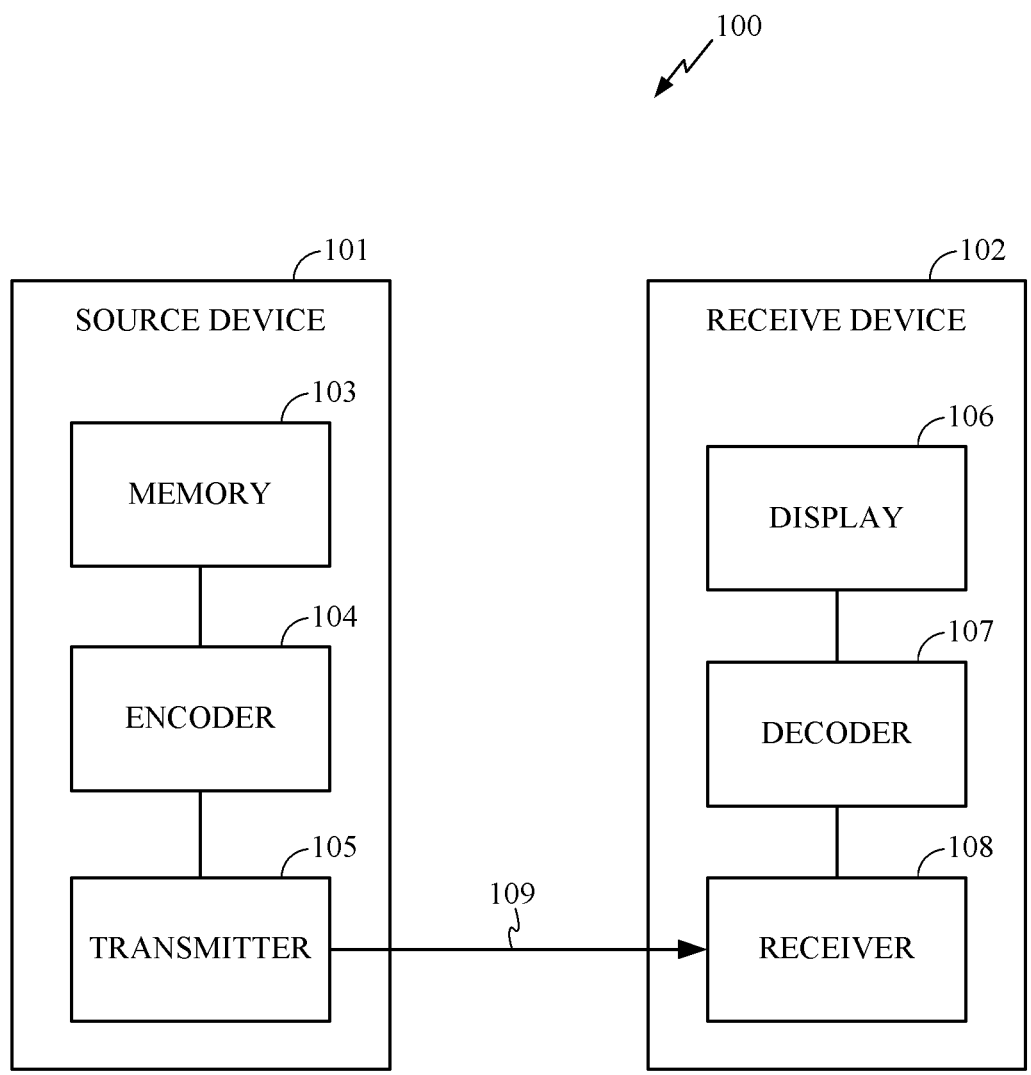
FIG. 1 is a top-level block diagram of an encoding source device and a decoding receiving device as used in one embodiment of the invention.

Embodiments of the invention include systems and methods for encoding multimedia video that is to be displayed to a user. In one embodiment, the systems and methods are adapted to control the encoded data rate for compressing the video. In some cases the video is transmitted wirelessly or through a wired network to a receiver for display. One step in compressing video relates to quantizing the transmitted video data. Quantization involves dividing the video data by a quantization parameter (QP) so as reduce the data size to a smaller, more manageable form.

Because not all segments of video data contain the same amount of information, different segments of the video may be quantized differently with different QPs. If the QP selected for a given section is too small, the compressed data will be of good quality, but won't be compressed to a high degree. This leads to generation of a high bit rate when the data is transmitted to a receiver. Conversely, if the QP selected is too large, the data will be compressed by a high degree, and the bitrate will be reduced as there are fewer bits to transmit. However, the quality of the video frames being transmitted will be relatively low since each frame will be represented by relatively fewer bits than if the QP was smaller. In one embodiment, the invention provides a system and method for quickly and accurately selecting a proper QP for a given slice of a video. Particularly, embodiments of the invention provide intelligent means for selecting the ranges likely to contain a suitable QP for a given block of data.

One method for determining the proper QP for a macroblock is the "brute-force" method. The brute-force implementation comprised encoding the same macroblock multiple times using a range of QP values, and choosing the optimal QP as the QP value that offers the minimal coding cost. Different cost criteria may be used to determine the proper QP for a particular macroblock. One cost measure is known as the rate-distortion cost, expressed as a combination of rate and distortion, $$C = D + \lambda R$$

where D is the distortion between the original video block and reconstructed video block due to quantization, R is the rate (number of bits) used to encode the input video block, and λ is a fixed parameter. Both distortion D and rate R are functions of QP as 1) QP directly affects the degree of distortion between the original video block and the reconstructed video block (higher QP means higher distortion); and 2) directly relates to the number of bits needed to encode the quantization residual coefficients (higher QP means a lower bit rate). In one possible embodiment λ may similarly depend on QP and may comprise the formula:

$$\lambda_{mode} = 0.85 * 2^{(QP-12)/3}$$

Depending on the application, the coefficients in this equation will be altered to specify the importance of the bit rate over distortion. Here, for example, with increasing QP the bitrate is given increasing relevance in selecting the optimal value.

As a result, the cost C is also a function of QP, C=C(QP). After multiple encodings of the current macroblock given a range of QP values, the best QP for the macroblock can be chosen as:

$$QP_{opt} = \arg\min(C(QP))$$

One improvement as described herein is to cache a default motion estimator for a specified QP and use this cached motion estimation when calculating the distortion for each of the QPs in the search range. This caching, although resulting in a less accurate measure of a potential QP's cost, saves considerable time, as the motion estimation need not be calculated repeatedly for each potential QP.

Inter Mode Decision:

Embodiments contemplate techniques to increase the encoding speed of the macroblock QP decision process. For example, during mode decision (when the encoder chooses the best coding mode among a multitude of possible coding modes for a macroblock), if inter mode is considered, motion search is performed to decide the optimal macroblock partition and the optimal motion vectors for each partition (both in terms of optimizing a cost metric). The encoder may perform motion search only when the macroblock is encoded for the nominal QP (which may be given by the end user or decided by the quality control specifications for the device) and store the motion search results. In one embodiment, the encoder retrieves the saved motion information in subsequent encoding rounds (with different values of macroblock QP) instead of invoking motion search again. This ensures that motion search, which is a costly and time-consuming process, is performed for each macroblock only once. To further reduce encoding time needed to decide optimal macroblock QP, the following additional techniques may be used:

Intra Mode Decision

In an inter-coded slice (i.e., P- or B-slice), intra coding modes (spatial prediction) and inter coding modes (temporal prediction) are both allowed. Therefore, during mode decision for P- and B-slice macroblocks, intra coding modes may also be considered. Intra modes are usually chosen for macroblocks that represent new objects in the current frame and/or scene change. However, compared to inter mode decision (where motion search results are not significantly influenced by the value of macroblock QP), intra mode decision depends on the value of macroblock QP. For example, with regard to H.264/AVC, four intra coding modes are allowed: intra 4×4, intra 8×8, intra 16×16 and IPCM. In the former two modes, the macroblock is partitioned into smaller blocks (4×4 or 8×8) and predicted sequentially in the raster scan order. Therefore, when the macroblock QP changes, the reconstructed blocks will change, therefore influencing the prediction and mode decision for subsequent blocks in the macroblock. In the optimal scheme, intra mode decision should be repeated using different QPs. However, this incurs long encoding time. To speed up intra mode decision, only one QP value may be used. Similar to inter mode decision, the intra mode decision results (which include the prediction mode) may be stored and re-used in subsequent encoding rounds with different QP values. While this may incur a performance loss due to non-optimal intra mode decision, the impact may remain limited as usually only a limited percentage of macroblocks in an inter slice (P or B-slice) are intra-coded. To further limit the impact of this non-optimal intra mode decision, the encoder may decide to perform intra mode decision multiple times for different QP values if and only if, during mode decision at the nominal QP, intra coding mode instead of inter coding mode is selected to be the best coding mode for the current macroblock.

QP Range Restriction:

Neighboring macroblocks usually are spatially correlated. This means the optimal QP values for neighboring macroblocks are usually similar. Depending on the optimal QP values for its already coded neighbors, a macroblock's search range for the optimal QP may be subjected to certain restrictions. The following pseudo code provides one possible implementation of these restraints:

```
Initialize currMBDeltaQP, e.g., currMBDeltaQP = 0
MB_CODING_LOOP_START:
currMBQP = sliceQP+currMBDeltaQP
// only consider currMBQP if it is within small range of predicted QP
Let QPpred be the predicted QP based on neighboring MBs' QPs
if (currMB is not a boundary MB and currMBQP is similar to QPpred)
    {
    encode_macroblock(currMBQP)
      if(currQPCost < minQPCost)
      {
      bestMBQP = currMBQP
      minQPCost = currQPCost
    }
}
Proceed to next delta QP value, currMBDeltaQP = nextDeltaQPValue
Go back to MB_CODING_LOOP_START until all delta QP values
are tested
```

Note that the pseudo code above provides a special condition for macroblocks that lie on the boundary of a video frame/slice. For these boundary macroblocks, one or more of their neighbors are not available. A variety of methods can be used to account for this condition, for example: 1) using a default frame/slice level QP for unavailable neighbors when calculating QP predictor; or 2) testing the full range of delta QP values. Option 2) has the advantage that it will alleviate the slow-start problem for non-boundary macroblocks by allowing the boundary macroblocks to search for the optimal QP value within a wider range.

Multiple methods may be used to calculate the QP predictor based on neighboring QPs. For example, an average QP of the left and the top neighbors may be used. Alternatively, an average QP of the left, the top, and the top-left neighbors may be used. Alternatively, an average QP of the left, the top, the top-left, and the top-right neighbors may be used. Various combinations are possible depending on the order in which the macroblocks are encoded.

Different methods to decide whether the current QP value is similar to QP predictor may be used for different types of slices. For example, a range of [QPpred−2, QPpred+1] may be applied on P-slice macroblocks, while a range of [QPpred−1, QPpred+2] may be applied on B-slice macroblocks.

Conditional restriction on QP search range helps reduce the number of encoding rounds performed for each macroblock, hence speeding up the encoding process. However the imposed restriction may incur some performance loss compared to exhaustive search. The performance loss may be more severe for macroblocks in I- and P-slices as rate-distortion performance of I- and P-slices will be propagated beyond the current group of pictures (GOP) until the next random access point (also known as IDR or instant decoder refresh picture in H.264/AVC) is encountered. Therefore, an alternative is to loosen or not apply conditional QP restriction on I- and P-slice macroblocks.

FIG. 1 is a block diagram illustrating an example system 100 in which a source device 101 transmits an encoded sequence of video data over communication link 109 to a receive device 102. Source device 101 and receive device 102 are both digital video devices. In particular, source device 101 encodes and transmits video data using any one of a variety of video compression standards, including those discussed supra. Communication link 109 may comprise a wireless link, a physical transmission line, a packet based network such as a local area network, wide-area network, or global network such as the Internet, a public switched telephone network (PSTN), or combinations of various links and networks. In other words, communication link 109 represents any suitable communication medium, or possibly a collection of different networks and links, for transmitting video data from source device 101 to receive device 102.

Source device 101 may be any digital video device capable of encoding and transmitting video data. For example, source device 101 may include memory 103 for storing digital video sequences, video encoder 104 for encoding the sequences, and transmitter 105 for transmitting the encoded sequences over communication link 109. Memory 103 may comprise computer memory such as dynamic memory or storage on a hard disk. Receive device 102 may be any digital video device capable of receiving and decoding video data. For example, receive device 102 may include a receiver 108 for receiving encoded digital video sequences, decoder 107 for decoding the sequences, and display 106 for displaying the sequences to a user.

Example devices for source device 101 and receive device 102 include servers located on a computer network, workstations or other desktop computing devices, and mobile computing devices such as laptop computers. Other examples include digital television broadcasting systems and receiving devices such as cellular telephones, digital televisions, digital cameras, digital video cameras or other digital recording devices, digital video telephones such as cellular radiotelephones and satellite radio telephones having video capabilities, other wireless video devices, and the like.

In some cases, source device 101 and receive device 102 each include an encoder/decoder (CODEC) (not shown) for encoding and decoding digital video data. In that case, both source device and receive device may include transmitters and receivers as well as memory and displays. Many of the encoding techniques outlined below are described in the context of a digital video device that includes an encoder. It is understood, however, that the encoder may form part of a CODEC.

Source device 101, for example, includes an encoder 104 that operates on blocks of pixels within the sequence of video images in order to encode the video data into a compressed format. For example, the encoder 104 of source device 101 may divide a video image frame to be transmitted into macroblocks comprising a number of smaller image blocks. For each macroblock in the image frame, encoder 104 of source device 101 searches macroblocks stored in memory 103 for the preceding video frame already transmitted (or a subsequent video frame) to identify a similar macroblock, and encodes the difference between the macroblocks, along with a motion vector that identifies the macroblock from the previous frame that was used for encoding. Source device 101 may support programmable thresholds which can cause termination of various tasks or iterations during the encoding process in order to reduce the number of computations and conserve power.

The receiver 108 of receive device 102 receives the motion vector and the encoded video data, and decoder 107 performs motion compensation techniques to generate video sequences for display to a user via display 106. One skilled in the art will readily recognize that rather than display the decoded data various other actions may be taken including storing the data, reformatting the data, or retransmitting the decoded data. The decoder 107 of receive device 102 may also be implemented as an encoder/decoder (CODEC). In that case, both source device and receive device may be capable of encoding, transmitting, receiving and decoding digital video sequences.

Figure 2:
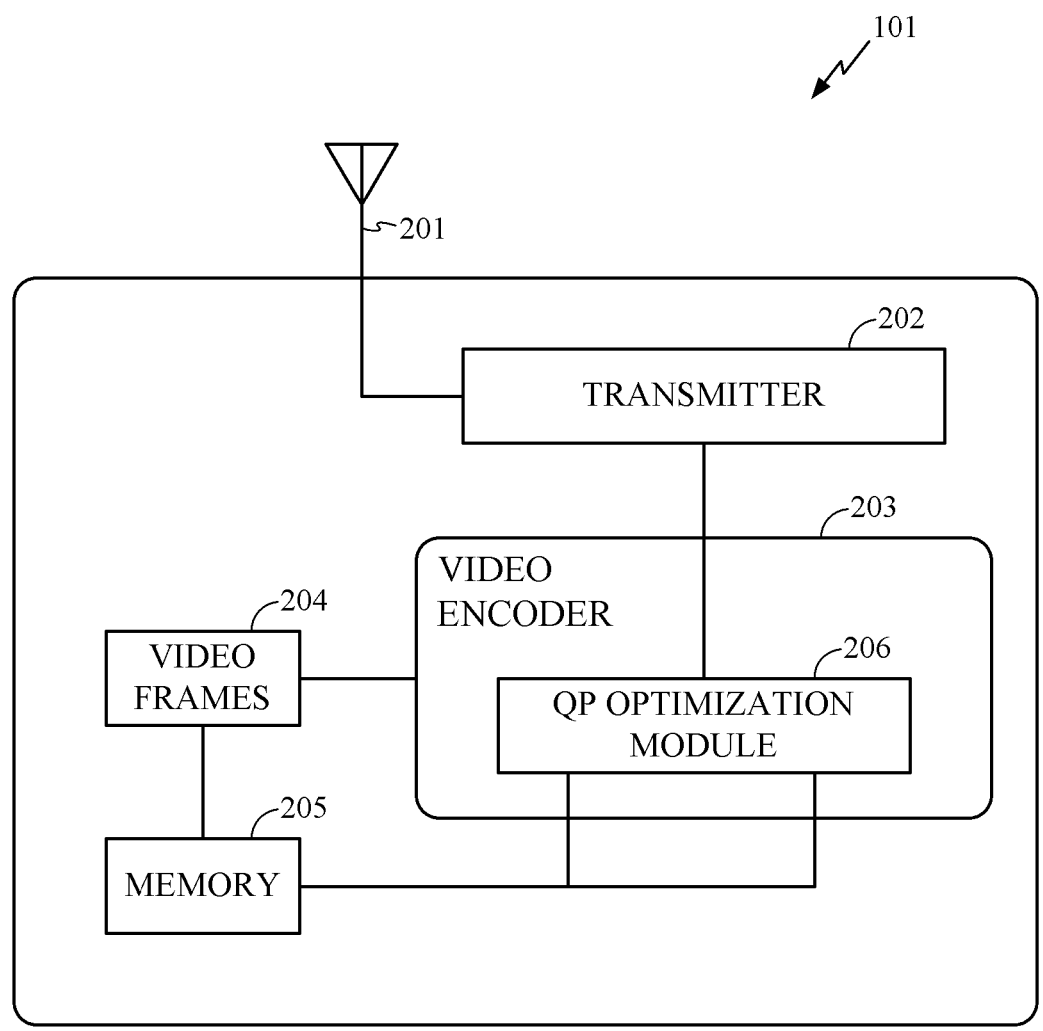
FIG. 2 is a schematic diagram of a source device in one embodiment of the invention, implementing a QP Optimization Module as described in embodiments of the present invention.

FIG. 2 is a block diagram illustrating an example source device 101, incorporating a video encoder 203 that compresses digital video sequences according to the techniques described herein. Exemplary digital video device 101 is illustrated as a wireless device, such as a mobile computing device, a personal digital assistant (PDA), a wireless communication device, a radio telephone, and the like. However, the techniques in this disclosure are not limited to wireless devices, and may be readily applied to other digital video devices including non-wireless devices.

In the example of FIG. 2, digital video device 101 is configured to transmit compressed digital video sequences via transmitter 202 and antenna 201. Video encoder 203 encodes the video sequences and buffers the encoded digital video sequences within video memory storage 205 prior to transmission. Memory storage 205 may also store computer readable instructions and data for use by video encoder 203 during the encoding process. Memory 205 may comprise synchronous dynamic random access memory (SDRAM), a hard disk, FLASH memory, electrically erasable programmable read only memory (EEPROM), or the like. Video frames 204 are extracted from memory 205 for encoding. As described in detail below, video encoder 203 implements a QP Optimization Module (QPOM) 206 that is configured to optimize video encoding performed by the video encoder 203. The QPOM 206 facilitates bit-rate control by having instructions that determine what parameters will be used by the encoder 203 during the encoding process.

Figure 3:
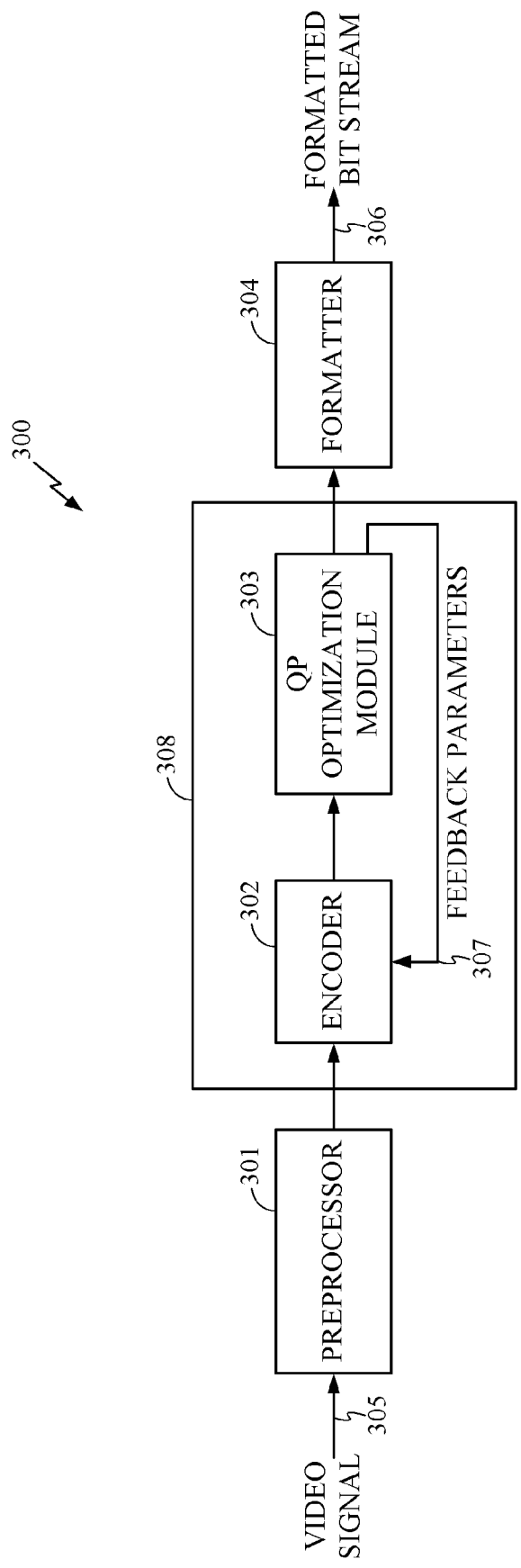
FIG. 3 is a general block diagram illustrating an encoding system in which the QP Optimization Module is utilized.

An exemplary data compression system 300 which incorporates a QPOM is illustrated in FIG. 3. A video signal 305 is first presented to preprocessor 301 in preparation for compression. Preprocessor 301 may serve a variety of purposes, or may be excluded from the system altogether. Preprocessor 301 may, for example, format the video signal 305 into components that are more easily processed by the compression system. The output of the preprocessor 301 is presented to encoder 302. Encoder 302 quantizes the data that it has received then compresses the quantized coefficients. The quantization performed is dependent on feedback quantization parameters 307 from the QPOM 303. Together, encoder 302 and QPOM 303 may comprise an encoding system 308 or CODEC. QPOM 303 utilizes statistics characterizing the current encoded segment of video to adaptively set the quantization parameters for encoding the next segment of video. This process of adaptively setting the quantization parameters for a video being encoded is described in more detail below. Once the data has been quantized it is sent to a formatter 304 that formats an output bitstream 306 for transmission. Formatter 304 takes the rate controlled data and assembles the data into a formatted bit stream for transmission through a communications channel. In doing so, Formatter 304 may append supplemental information to the data. For example, signals indicative of start of block, start of frame, block number, frame number, and quantization information may be appended to the data signal by formatter 304.

Figure 4:
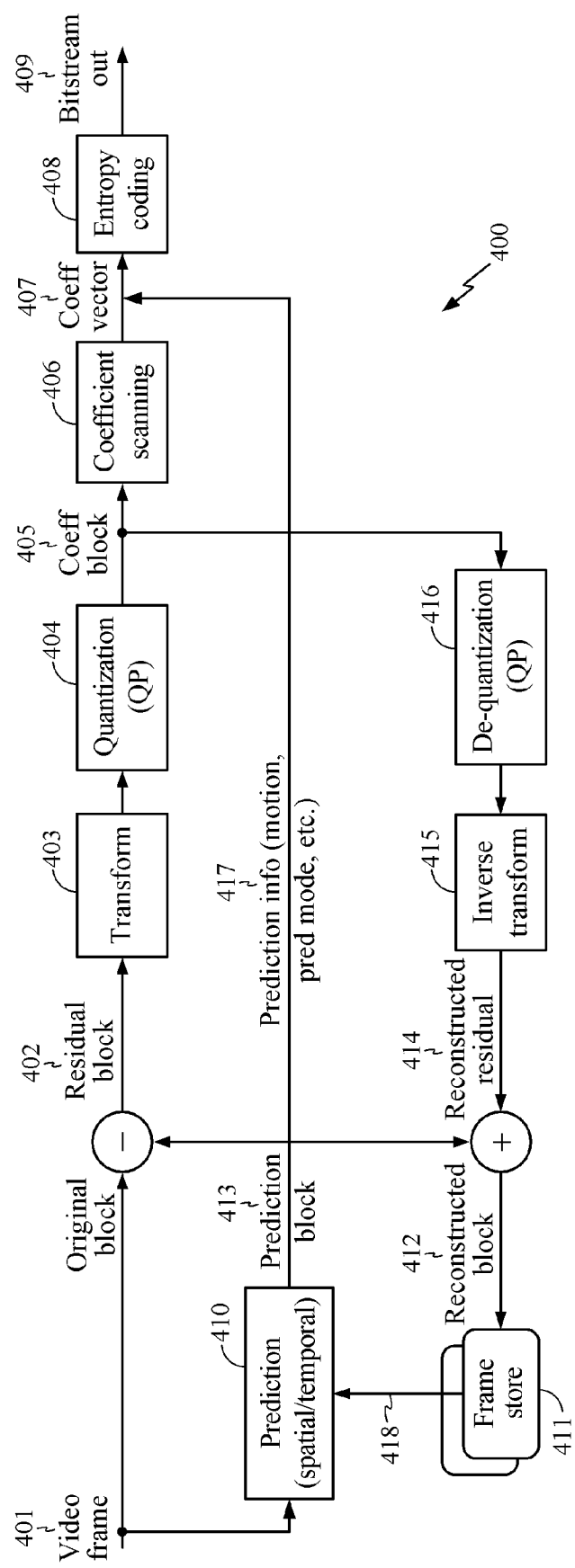
FIG. 4 is a block diagram of the block encoding process using a Quantization Parameter.

Block-based video coding is widely used in video coding standards such as H.261/H.263, MPEG1/2/4 and the latest H.264/AVC. In block-based video coding system, an input video frame is processed block-by-block. A commonly used block size is 16×16, which is also known as a macroblock. FIG. 4 shows a block diagram of one example of block-based video encoding. One skilled in the art will readily recognize that additional features are possible. FIG. 4 provides a generalized overview of the operation of the encoder and its use of the QP. For each input video block of data 401, the system generates a prediction block 413. The prediction block 413 is formed by a prediction module 410 that performs either a spatial prediction (prediction within the same frame using already neighbors) or temporal prediction (prediction across frames), and may be used in the subsequent encoding process 417. A residual block 402 is then calculated by subtracting the values of the prediction block from the values of the corresponding original video block from frame 401. The residual block 402 is then run through a transform module 403 which, for example, performs a discrete cosign transform (DCT) transformation on the residual block 402. Following transformation, the residual block is quantized using a chosen quantization parameter at a quantization module 404. A set of quantized transform coefficients 405 are then scanned into a 1-dimensional vector at a coefficient scanning module 406 and entropy coded at an entropy coding module 408 before being sent out as an encoded bitstream 409.

As shown by block 416, the quantization parameter is not only used to quantize the block, but also to determine quantization efficiency. The residual block 414 is reconstructed by de-quantizing 416 and inverting 415 the quantized residual block. This reconstructed block 412 is then stored 411 and used not only in determining the efficiency of the quantization parameter for this particular block, but also for the subsequent prediction 418 of future blocks.

Figure 5:
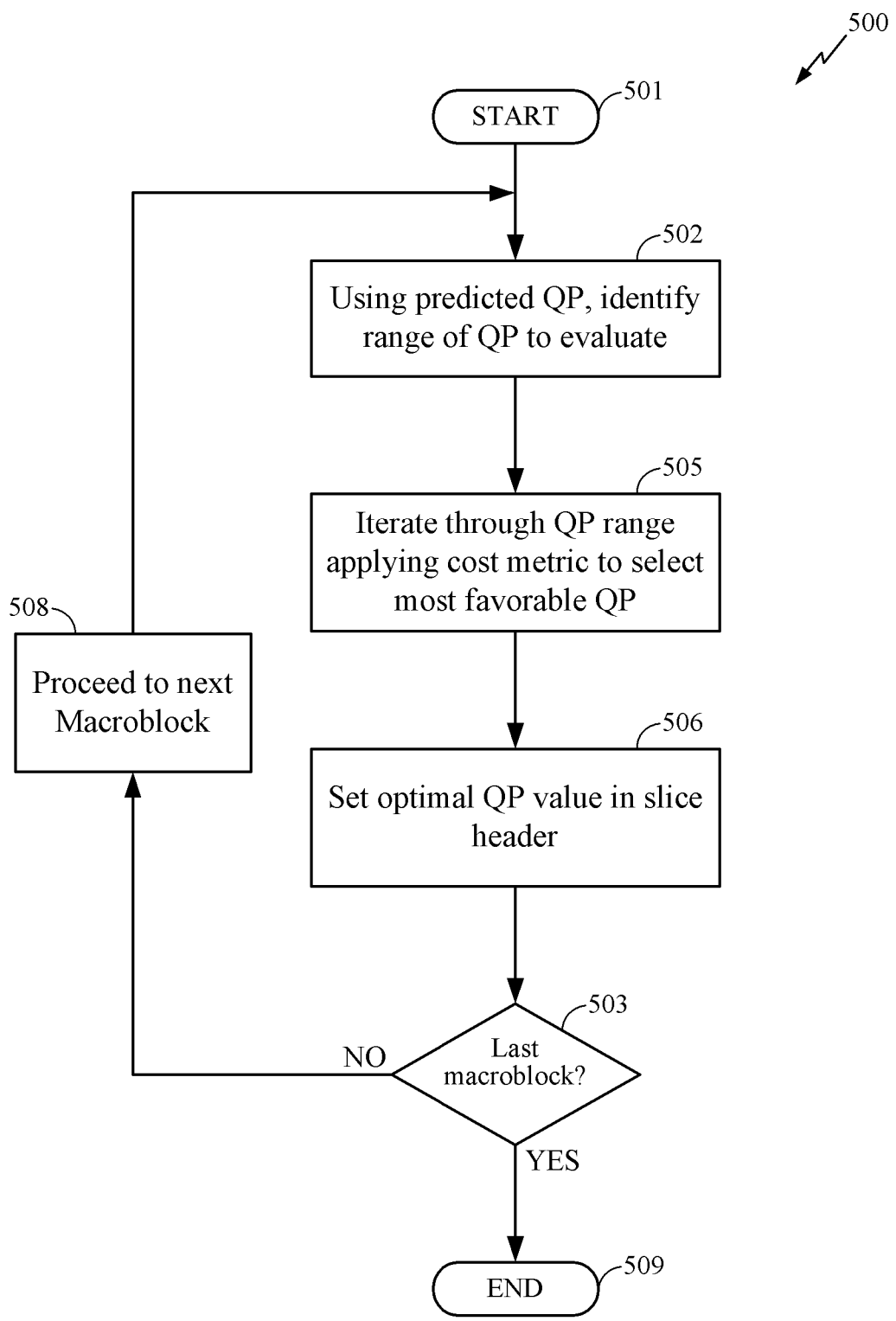
FIG. 5 is a schematic diagram of the operational flow of the QP Optimization Module.

FIG. 5 illustrates a generalized flow diagram of one possible embodiment of the QPOM's 303 operation process 500. Process 500 begins at a start state 501 by accepting the first macroblock. For the first macroblock, the predicted value for QP may be determined by a default method, for example, brute force optimization search. A brute force optimization search comprises iterating over all possible QP values, applying a cost metric for each, and selecting the QP generating the optimal cost metric (as discussed supra). One skilled in the art will recognize that various alternative methods exist for selecting an initial predicted QP, such as a default based on the statistical properties of the video signal, or a global prediction—any one of these alternatives will suffice so long as the resulting QP provides reasonable quantization. For subsequent macroblocks, the Process 500 may select a predicted QP based on neighboring QPs or previous optimal QPs. If the current macroblock is at the corner of a frame, i.e. neighbors are unavailable, alternative neighbors or a default value may be used for the predicted QP. Once the predicted QP has been selected, the Process 500 identifies the range of QP to evaluate at a state 502. The Process 500 iterates through the QP range applying a cost metric to determine the efficiency of each QP within the range. As discussed above, the cost metric may comprise the rate-distortion cost. Once the optimal QP has been determined, process 500 inserts the predicted QP into the slice header at a state 506. This will be the QP used for this macroblock's subsequent quantization by the system. Process 500 then determines whether more macroblocks are available for processing at a decision state 503. If macroblocks are available the process will continue with the next macroblock at a state 508. If macroblocks are not available, the process will end at an end state 509.

Normally, the range selected will simply extend by an integer offset less than the predicted QP and an integer offset higher than the predicted QP (i.e., ±3). However, the range selected may be biased above or beneath the QP and may depend on the type of frame being quantized. H.264, for example, comprise I, P, or B frames. I and P frames, are more frequently referenced by other frames than B frames, to recover image information. Accordingly, I and P frames should normally be quantized less, so that their information is not lost. Thus, upon recognizing an I or P frame, the QPOM may instead select a range biased to a lower QP—i.e., 2 less than the predicted QP and only 1 above. This will increase the chance that the optimal QP is lower than the predicted QP. In contrast, there will be occasions when an upward bias would be preferable, i.e., in systems requiring a high bitrate, with less emphasis on quality.

Thus, a novel and improved method and apparatus for encoding video has been described. Those of skill in the art would understand that the various illustrative logical blocks, modules, circuits, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application. As examples, the various illustrative logical blocks, modules, circuits, and algorithm steps described in connection with the embodiments disclosed herein may be implemented or performed with a digital signal processor (DSP), an application specific integrated circuit (ASIC), a field programmable gate array (FPGA) or other programmable logic device, discrete gate or transistor logic, discrete hardware components such as, e.g., registers and FIFO, a processor executing a set of firmware instructions, any conventional programmable software module and a processor, or any combination thereof. The processor may be a microprocessor, but in the alternative, the processor may be any conventional processor, controller, microcontroller, or state machine. The software module could reside in RAM memory, flash memory, ROM memory, registers, hard disk, a removable disk, a CD-ROM, or any other form of storage medium known in the art. Those of skill would further appreciate that the data, instructions, commands, information, signals, bits, symbols, and chips that may be referenced throughout the above description are represented by voltages, currents, electromagnetic waves, magnetic fields or particles, optical fields or particles, or any combination thereof.

The previous description of the preferred embodiments is provided to enable any person skilled in the art to make or use the disclosed embodiments. The various modifications to these embodiments will be readily apparent to those skilled in the art, and the generic principles defined herein may be applied to other embodiments without the use of the inventive faculty. Thus, the disclosed embodiments are not intended to be limited to the embodiments shown herein but is to be accorded the widest scope consistent with the principles and novel features disclosed herein.

We claim:

1. A system for encoding video, comprising:
   a storage containing a video frame comprising a macroblock, wherein the macroblock comprises a macroblock of a P-slice; and
   a processor in communication with the storage, the processor configured to:
   determine quantization parameters for a plurality of neighboring macroblocks of the macroblock in the same video frame as the macroblock;
   determine an average of the quantization parameters for the neighboring macroblocks;
   select a predicted quantization parameter based on the average of the quantization parameters for the neighboring macroblocks;
   select a range of quantization parameters for quantizing the macroblock, wherein the range is a subset of possible quantization parameters and the range is based on the value of the predicted quantization parameter, wherein the range of quantization parameters comprises: [QPpred−2, QPpred+1], wherein QPpred is the value of the predicted quantization parameter;
   determine a quantization parameter in the range which results in an optimal quantization of the macroblock; and
   encode the macroblock using the determined quantization parameter.

2. The system of claim 1, wherein the processor is configured to determine the quantization parameter comprises a cache of prior motion searches.

3. The system of claim 1, wherein the processor is configured to determine the quantization parameter comprises a cache of intra mode decision results.

4. The system of claim 1, wherein the storage comprises dynamic memory.

5. The system of claim 1, wherein the storage comprises a hard disk.

6. The system of claim 1, wherein the predicted quantization parameter is selected based on at least a value of a previously determined quantization parameter.

7. The system of claim 6, wherein the previously determined quantization parameter is a quantization parameter for a preceding macroblock.

8. The system of claim 1, wherein the average of the quantization parameters is determined using at least an average of quantization parameters of at least two neighboring macroblocks.

9. The system of claim 1, wherein the average of the quantization parameters is determined using at least an average of quantization parameters of at least three neighboring macroblocks.

10. The system of claim 1, wherein the average of the quantization parameters is determined using at least an average of quantization parameters of at least four neighboring macroblocks.

11. The system of claim 1, wherein in an absence of one or more neighboring macroblocks, the predicted quantization parameter is selected based on a default quantization parameter value.

12. The system of claim 1, wherein all possible quantization parameter values are used in the selection of the predicted quantization parameter when neighboring macroblocks are not available.

13. The system of claim 1, wherein the quantization module further comprises a buffer storing the previously determined quantization parameter for each block.

14. The system of claim 1, wherein the system is a cellular telephone.

15. The system of claim 1, wherein the optimal quantization of the macroblock comprises a lowest rate-distortion cost for the macroblock.

16. A system for encoding video, comprising:
  means for receiving a video frame comprising a macroblock for quantization, wherein the received macroblock comprises a macroblock of a P-slice;
  means for determining quantization parameters for a plurality of neighboring macroblocks of the macroblock in the same video frame as the macroblock;
  means for determining an average of the quantization parameters for the neighboring macroblocks;
  means for selecting a predicted quantization parameter based on the average of the quantization parameters for the neighboring macroblocks;
  means for selecting a range of quantization parameters for quantizing the macroblock, wherein the range is a subset of possible quantization parameters and the range is based on the value of the predicted quantization parameter, wherein the range of quantization parameters comprises: [QPpred−2, QPpred+1], wherein QPpred is the value of the predicted quantization parameter;
  means for determining a quantization parameter in the range which results in an optimal quantization of the macroblock; and
  means for encoding the macroblock using the determined quantization parameter.

17. The system of claim 16, wherein the means for selecting the range of quantization parameters comprises a cache of prior motion searches.

18. The system of claim 16, wherein the means for selecting the range of quantization parameters comprises a cache of intra mode decision results.

19. The system of claim 16, wherein the means for receiving the video frame comprises an electronic storage.

20. The system of claim 19, wherein the electronic storage is a computer memory.

21. The system of claim 16, wherein the predicted quantization parameter is selected based on at least a value of a previously determined quantization parameter.

22. The system of claim 21, wherein the previously determined quantization parameter is a quantization parameter for a preceding macroblock.

23. The system of claim 16, wherein the average of the quantization parameters is determined using at least an average of quantization parameters of at least two neighboring macroblocks.

24. The system of claim 16, wherein the average of the quantization parameters is determined using at least an average of quantization parameters of at least three neighboring macroblocks.

25. The system of claim 16, wherein the average of the quantization parameters is determined using at least an average of quantization parameters of at least four neighboring macroblocks.

26. The system of claim 16, wherein in an absence of one or more neighboring macroblocks, the predicted quantization parameter is selected based on a default quantization parameter value.

27. The system of claim 16, wherein all possible quantization parameter values are used in the selection of the predicted quantization parameter when neighboring macroblocks are not available.

28. The system of claim 16, wherein the means for selecting comprises at least a part of a quantization parameter optimization module.

29. The system of claim 16, wherein the means for determining comprises at least a part of a quantization parameter optimization module.

30. The system of claim 16, wherein the means for encoding the macroblock comprises a video encoder.

31. The system of claim 16, wherein the optimal quantization of the macroblock comprises a lowest rate-distortion cost for the macroblock.

32. A method for encoding video, comprising the steps of:
  receiving a video frame comprising a macroblock for quantization, wherein the received macroblock comprises a macroblock of a P-slice;
  determining quantization parameters for a plurality of neighboring macroblocks of the macroblock in the same video frame as the macroblock;
  determining an average of the quantization parameters for the neighboring macroblocks;
  selecting a predicted quantization parameter based on the average of the quantization parameters for the neighboring macroblocks;
  selecting a range of quantization parameters for quantizing the macroblock, wherein the range is a subset of possible quantization parameters and the range is based on the value of the predicted quantization parameter, wherein the range of quantization parameters comprises: [QPpred−2, QPpred+1], wherein QPpred is the value of the predicted quantization parameter;
  determining a quantization parameter in the range which results in a lowest distortion value for the macroblock; and
  encoding the macroblock using the determined quantization parameter.

33. The method of claim 32, wherein the step of determining the quantization parameter includes the step of caching prior motion searches.

34. The method of claim 32, wherein the step of determining the quantization parameter includes the step of caching intra mode decision results.

35. The method of claim 32, further comprising the step of selecting the predicted quantization parameter based on at least a value of a previously determined quantization parameter.

36. The method of claim 35, wherein the previously determined quantization parameter is a quantization parameter for a preceding macroblock.

37. The method of claim 32, wherein the average of the quantization parameters is determined using at least an average of quantization parameters for one of at least two neighboring macroblocks, at least three neighboring macroblocks, and at least four neighboring macroblocks.

38. The method of claim 32, wherein in an absence of one or more neighboring macroblocks, the predicted quantization parameter is selected based on a default quantization parameter value.

39. A system for encoding video, comprising:
  a storage containing a video frame comprising a macroblock, wherein the macroblock comprises a macroblock of a P-slice; and
  a processor in communication with the storage, the processor configured to:
    cache prior motion searches;
    determine quantization parameters for a plurality of neighboring macroblocks of the macroblock in the same video frame as the macroblock;
    determine an average of the quantization parameters for the neighboring macroblocks;
    select a predicted quantization parameter based on the average of the quantization parameters for the neighboring macroblocks;

select a range of quantization parameters for quantizing the macroblock, wherein the range is a subset of possible quantization parameters and the range is based on the value of the predicted quantization parameter, wherein the range of quantization parameters comprises: [QPpred−2, QPpred+1], wherein QPpred is the value of the predicted quantization parameter;

determine a quantization parameter which results in an optimal quantization of the macroblock, based at least in part on at least one of the cached prior motion searches; and encode the macroblock using the determined quantization parameter.

40. A system for encoding video, comprising:

a storage containing a video frame comprising a macroblock, wherein the macroblock comprises a macroblock of a P-slice; and a processor in communication with the storage, the processor configured to:

cache intra mode decision results;

determine quantization parameters for a plurality of neighboring macroblocks of the macroblock in the same video frame as the macroblock;

determine an average of the quantization parameters for the neighboring macroblocks;

select a predicted quantization parameter based on the average of the quantization parameters for the neighboring macroblocks;

select a range of quantization parameters for quantizing the macroblock, wherein the range is a subset of possible quantization parameters and the range is based on the value of the predicted quantization parameter, wherein the range of quantization parameters comprises: [QPpred−2, QPpred+1], wherein QPpred is the value of the predicted quantization parameter;

determine a quantization parameter which results in an optimal quantization of the macroblock, based at least in part on at least one of the cached intra mode decision results; and encode the macroblock using the determined quantization parameter.

41. A non-transitory computer readable storage medium comprising a computer readable program code adapted to be executed to perform a method comprising:

receiving a video frame comprising a macroblock for quantization, wherein the received macroblock comprises a macroblock of a P-slice;

determining quantization parameters for a plurality of neighboring macroblocks of the macroblock in the same video frame as the macroblock;

determining an average of the quantization parameters for the neighboring macroblocks;

selecting a predicted quantization parameter based on the average of the quantization parameters for the neighboring macroblocks;

selecting a range of quantization parameters for quantizing the macroblock, wherein the range is a subset of possible quantization parameters and the range is based on the value of the predicted quantization parameter, wherein the range of quantization parameters comprises: [QPpred−2, QPpred+1], wherein QPpred is the value of the predicted quantization parameter;

determining a quantization parameter in the range which results in a lowest distortion value for the macroblock; and encoding the macroblock using the determined quantization parameter.

42. A system for encoding video, comprising:

a storage containing a video frame comprising a macroblock, wherein the macroblock comprises a macroblock of a B-slice; and a processor in communication with the storage, the processor configured to:

determine quantization parameters for a plurality of neighboring macroblocks of the macroblock in the same video frame as the macroblock;

determine an average of the quantization parameters for the neighboring macroblocks;

select a predicted quantization parameter based on the average of the quantization parameters for the neighboring macroblocks;

select a range of quantization parameters for quantizing the macroblock, wherein the range is a subset of possible quantization parameters and the range is based on the value of the predicted quantization parameter, wherein the range of quantization parameters comprises: [QPpred−1, QPpred+2], wherein QPpred is the value of the predicted quantization parameter;

determine a quantization parameter in the range which results in an optimal quantization of the macroblock; and encode the macroblock using the determined quantization parameter.

43. A system for encoding video, comprising:

means for receiving a video frame comprising a macroblock for quantization, wherein the received macroblock comprises a macroblock of a B-slice;

means for determining quantization parameters for a plurality of neighboring macroblocks of the macroblock in the same video frame as the macroblock;

means for determining an average of the quantization parameters for the neighboring macroblocks;

means for selecting a predicted quantization parameter based on the average of the quantization parameters for the neighboring macroblocks;

means for selecting a range of quantization parameters for quantizing the macroblock, wherein the range is a subset of possible quantization parameters and the range is based on the value of the predicted quantization parameter, wherein the range of quantization parameters comprises: [QPpred−1, QPpred+2], wherein QPpred is the value of the predicted quantization parameter;

means for determining a quantization parameter in the range which results in an optimal quantization of the macroblock; and means for encoding the macroblock using the determined quantization parameter.

44. A system for encoding video, comprising:

a storage containing a video frame comprising a macroblock, wherein the macroblock comprises a macroblock of a B-slice; and a processor in communication with the storage, the processor configured to:

cache prior motion searches;

determine quantization parameters for a plurality of neighboring macroblocks of the macroblock in the same video frame as the macroblock;

determine an average of the quantization parameters for the neighboring macroblocks;

select a predicted quantization parameter based on the average of the quantization parameters for the neighboring macroblocks;

select a range of quantization parameters for quantizing the macroblock, wherein the range is a subset of possible quantization parameters and the range is based on the value of the predicted quantization parameter, wherein the range of quantization parameters comprises: [QPpred−2, QPpred+1], wherein QPpred is the value of the predicted quantization parameter;

determine a quantization parameter which results in an optimal quantization of the macroblock, based at least in part on at least one of the cached prior motion searches; and encode the macroblock using the determined quantization parameter.

45. A system for encoding video, comprising:

a storage containing a video frame comprising a macroblock, wherein the macroblock comprises a macroblock of a B-slice; and a processor in communication with the storage, the processor configured to:

cache prior motion searches;

determine quantization parameters for a plurality of neighboring macroblocks of the macroblock in the same video frame as the macroblock;

determine an average of the quantization parameters for the neighboring macroblocks;

select a predicted quantization parameter based on the average of the quantization parameters for the neighboring macroblocks;

select a range of quantization parameters for quantizing the macroblock, wherein the range is a subset of possible quantization parameters and the range is based on the value of the predicted quantization parameter, wherein the range of quantization parameters comprises: [QPpred−2, QPpred+1], wherein QPpred is the value of the predicted quantization parameter;

determine a quantization parameter which results in an optimal quantization of the macroblock, based at least in part on at least one of the cached intra mode decision results; and encode the macroblock using the determined quantization parameter.

46. A system for encoding video, comprising:

a storage containing a video frame comprising a macroblock, wherein the macroblock comprises a macroblock of a B-slice; and a processor in communication with the storage, the processor configured to:

cache intra mode decision results;

determine quantization parameters for a plurality of neighboring macroblocks of the macroblock in the same video frame as the macroblock;

determine an average of the quantization parameters for the neighboring macroblocks;

select a predicted quantization parameter based on the average of the quantization parameters for the neighboring macroblocks;

select a range of quantization parameters for quantizing the macroblock, wherein the range is a subset of possible quantization parameters and the range is based on the value of the predicted quantization parameter, wherein the range of quantization parameters comprises: [QPpred−1, QPpred+2], wherein QPpred is the value of the predicted quantization parameter;

determine a quantization parameter which results in an optimal quantization of the macroblock, based at least in part on at least one of the cached intra mode decision results; and encode the macroblock using the determined quantization parameter.

47. A non-transitory computer readable storage medium comprising a computer readable program code adapted to be executed to perform a method comprising:

receiving a video frame comprising a macroblock for quantization, wherein the received macroblock comprises a macroblock of a B-slice;

determining quantization parameters for a plurality of neighboring macroblocks of the macroblock in the same video frame as the macroblock;

determining an average of the quantization parameters for the neighboring macroblocks;

selecting a predicted quantization parameter based on the average of the quantization parameters for the neighboring macroblocks;

selecting a range of quantization parameters for quantizing the macroblock, wherein the range is a subset of possible quantization parameters and the range is based on the value of the predicted quantization parameter, wherein the range of quantization parameters comprises: [QPpred−1, QPpred+2], wherein QPpred is the value of the predicted quantization parameter;

determining a quantization parameter in the range which results in a lowest distortion value for the macroblock; and encoding the macroblock using the determined quantization parameter.

* * * * *